(12) United States Patent
Baek (10) Patent No.: US 9,731,764 B2
(45) Date of Patent: Aug. 15, 2017

(54) AUTOMATIC PARKING CONTROLLING APPARATUS AND METHOD OF VEHICLE

(71) Applicant: HYUNDAI MOBIS CO., LTD., Seoul (KR)

(72) Inventor: Hyun Wook Baek, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 143 days.

(21) Appl. No.: 14/597,790

(22) Filed: Jan. 15, 2015

(65) Prior Publication Data

US 2016/0159397 A1    Jun. 9, 2016

(30) Foreign Application Priority Data

Dec. 3, 2014    (KR) .................. 10-2014-0172013

(51) Int. Cl.
*B62D 15/02*    (2006.01)
*B60W 30/06*    (2006.01)

(52) U.S. Cl.
CPC ......... *B62D 15/0285* (2013.01); *B60W 30/06* (2013.01)

(58) Field of Classification Search
CPC ............................ B62D 15/0285; B60W 30/06
See application file for complete search history.

(56) References Cited

U.S. PATENT DOCUMENTS

| 2014/0136043 A1* | 5/2014 | Guarnizo Martinez | B60W 40/13 701/23 |
|---|---|---|---|
| 2015/0100193 A1* | 4/2015 | Inagaki | B60W 30/06 701/23 |

FOREIGN PATENT DOCUMENTS

| EP | 1 215 089 A1 | 6/2002 | |
|---|---|---|---|
| JP | EP 1327553 A2 * | 7/2003 | ............. B60K 31/10 |
| JP | 2014-146182 A | 8/2014 | |
| KR | 10-2009-0036794 A | 4/2009 | |
| KR | 10-2010-0055720 A | 5/2010 | |
| KR | 10-2012-0082212 A | 7/2012 | |
| KR | 10-2014-0107041 A | 9/2014 | |
| WO | WO 2012/136721 A1 | 10/2012 | |

* cited by examiner

*Primary Examiner* — Jerrah Edwards
*Assistant Examiner* — Kelly D Williams
(74) *Attorney, Agent, or Firm* — NSIP Law (57) ABSTRACT

Provided are an automatic parking controlling apparatus and method of a vehicle for effectively, safely parking a vehicle in a parking space. The automatic parking controlling apparatus of a vehicle includes a parking space recognizing unit configured to sense an obstacle on the side of a vehicle to recognize a parking space, a gradient angle calculating unit configured to calculate a gradient angle of a road surface by using a gradient of the vehicle and a degree to which the vehicle has slipped backwards according to a comparison between forward movement acceleration of the vehicle and a speed of the vehicle, a parking path calculating unit configured to calculate sequential turning paths for reverse perpendicular parking based on the calculated gradient angle of the road surface and the recognized parking space, and a control unit configured to control steering for reverse perpendicular parking according to the calculated sequential turning paths.

20 Claims, 7 Drawing Sheets

FIG. 7 ation No. 10-2014-0172013, filed on Dec. 3, 2014, the disclosure of which is incorporated herein by reference in its entirety.

TECHNICAL FIELD

The present invention relates to an automatic parking controlling apparatus and method and, more particularly, to an automatic parking controlling apparatus and method of a vehicle for measuring a gradient of a vehicle that attempts at reverse parking on a slope with a gradient equal to or greater than a predetermined level, and effectively, safely parking the vehicle in a parking space recognized according to a measured gradient.

BACKGROUND

As vehicles are admitted as daily necessaries to modern people, new vehicles have rapidly been released and operated, and thus, various social problems such as traffic congestion, a parking problem, and the like, have arisen.

In particular, parking is a serious issue and an increase in vehicles in number inevitably reduces parking spaces in limited areas, cities, and countries, and in order to resolve the shortage of parking spaces, parking slot comparted to allow a single vehicle to park has been gradually decreased.

Also, if several vehicles are parked together in a parking space without a parking slot, spaces between vehicles are prone to be tight, and in this case, a driver should check an obstacle around with his or her naked eyes and directly drive a vehicle to park it in a narrow parking space, or may have difficulty in pulling out the vehicle from the narrow parking space.

Recently, a technique of installing an automatic parking system in a vehicle to check captured images of a surrounding environment of a vehicle, and the like, and automatically parking the vehicle has been developed and released.

Such an automatic parking system assists a driver in parking a vehicle by automatically steering the vehicle when the driver performs perpendicular parking or longitudinal parking to a parking space using a camera installed in the rear side of the vehicle, or assists the driver in parking a vehicle by sensing an obstacle around the vehicle with a distance sensor installed on the side of the vehicle.

However, such a general automatic parking system merely senses an obstacle during a process of automatically parking a vehicle and sounds an alarm or informs a driver about a risk of collision with the obstacle, failing to generate an accurate path for avoiding an obstacle in a parking space. Thus, a driver should recognize a path for avoiding an obstacle with his or her naked eyes or through any other equipment or the driver should directly drive to avoid an obstacle, causing driver's inconvenience.

SUMMARY

Accordingly, the present invention provides an automatic parking controlling apparatus and method of a vehicle for measuring a gradient of a vehicle that attempts at reverse parking on a slope having a gradient equal to or greater than a predetermined level, and effectively, safely parking the vehicle in a parking space recognized according to the measured gradient.

In one general aspect, an automatic parking controlling apparatus of a vehicle includes: a parking space recognizing unit configured to sense an obstacle on the side of a vehicle to recognize a parking space; a gradient angle calculating unit configured to calculate a gradient angle of a road surface by using a gradient of the vehicle and a degree to which the vehicle has slipped backwards according to a comparison between forward movement acceleration of the vehicle and a speed of the vehicle; a parking path calculating unit configured to calculate sequential turning paths for reverse perpendicular parking based on the calculated gradient angle of the road surface and the recognized parking space; and a control unit configured to control steering for reverse perpendicular parking according to the calculated sequential turning paths.

The parking space recognizing unit may sense the obstacle positioned on one side of the vehicle, measure a width and a length of the parking space, and measure positions of a first corner and a second corner with respect to the obstacle to recognize the parking space.

The parking path calculating unit may calculate a first turning angle, a parking start position, and a first stop position satisfying a collision avoidance condition with respect to the first corner and the second corner when the vehicle is steered to the maximum level according to the gradient angle of the road surface calculated by the gradient angle calculating unit, to thereby calculate a first turning path, calculate a second turning angle and a second stop position satisfying a condition in which one end of a central line of rear wheels of the vehicle and a y axis of the second corner meet according to the gradient angle of the road surface calculated by the gradient angle calculating unit, to thereby calculate a second turning path, and calculate a third turning angle, a third stop position, and a parking end position satisfying a condition in which the vehicle is aligned along a central line of the parking space according to the gradient angle of the road surface calculated by the gradient angle calculating unit, to thereby calculate a third turning path.

The parking path calculating unit may calculate a first turning angle, a parking start position, and a first stop position satisfying a collision avoidance condition with respect to the first corner and the second corner when the vehicle is steered to the maximum level, to thereby calculate a first turning path, calculate a second turning angle and a second stop position satisfying a condition in which one end of a central line of rear wheels of the vehicle and a y axis of the second corner meet, to thereby calculate a second turning path, and calculate a third turning angle, a third stop position, and a parking end position satisfying a condition in which the vehicle is aligned along a central line of the parking space, to thereby calculate a third turning path, and thereafter, the parking path calculating unit may correct the calculated first, second, and third turning paths according to the gradient angle of the road surface calculated by the gradient angle calculating unit, to thereby calculate final first, second, and third turning paths.

When the reverse perpendicular parking is performed, the control unit may control an output device to output reverse parking state information according to the gradient of the road surface through at least one among video, audio, and text.

In another general aspect, an automatic parking controlling method of a vehicle includes: sensing an obstacle on the side of a vehicle to recognize a parking space; calculating a gradient angle of a road surface by using a gradient of the vehicle and a degree to which the vehicle has slipped backwards according to a comparison between forward movement acceleration of the vehicle and a speed of the vehicle; calculating sequential turning paths for reverse perpendicular parking based on the calculated gradient angle of the road surface and the recognized parking space; and controlling steering for reverse perpendicular parking according to the calculated sequential turning paths.

The recognizing of a parking space may include: sensing the obstacle and measuring a width and a length of the parking space; and measuring positions of a first corner and a second corner with respect to the obstacle.

The calculating of sequential turning paths may include: calculating a first turning angle, a parking start position, and a first stop position satisfying a collision avoidance condition with respect to the first corner and the second corner when the vehicle is steered to the maximum level according to the calculated gradient angle of the road surface, to thereby calculate a first turning path; calculating a second turning angle and a second stop position satisfying a condition in which one end of a central line of rear wheels of the vehicle and a y axis of the second corner meet according to the calculated gradient angle of the road surface, to thereby calculate a second turning path; and calculating a third turning angle, a third stop position, and a parking end position satisfying a condition in which the vehicle is aligned along a central line of the parking space according to the calculated gradient angle of the road surface, to thereby calculate a third turning path.

The controlling of steering may include: turning the vehicle to reverse from the parking start position to the first stop position at the first turning angle according to the first turning path; turning to move forwards from the first stop position to the second stop position at the second turning angle according to the second turning path; and turning to reverse from the second stop position to the third stop position at the third turning angle according to the third turning path, and reversing from the third stop position to the parking end position.

The sum of the first turning angle, the second turning angle, and the third tuning angle may be 90 degrees.

The method may further include: when the reverse perpendicular parking is performed, outputting reverse parking state information according to the gradient of the road surface to an output device through at least one among video, audio, and text.

In another general aspect, an automatic parking controlling method of a vehicle includes: sensing an obstacle on the side of a vehicle to recognize a parking space; calculating a gradient angle of a road surface by using a gradient of the vehicle and a degree to which the vehicle has slipped backwards according to a comparison between forward movement acceleration of the vehicle and a speed of the vehicle; calculating sequential turning paths for reverse perpendicular parking based on the recognized parking space and subsequently correcting the calculated turning paths according to the calculated gradient angle of the road surface to thus calculate final turning paths for reverse parking on a slope; and controlling steering for reverse perpendicular parking according to the calculated sequential turning paths.

The calculating of turning paths may include: calculating a first turning angle, a parking start position, and a first stop position satisfying a collision avoidance condition with respect to the first corner and the second corner when the vehicle is steered to the maximum level to thereby calculate a first turning path, and subsequently correcting the first turning path according to the calculated gradient angle of the road surface; calculating a second turning angle and a second stop position satisfying a condition in which one end of a central line of rear wheels of the vehicle and a y axis of the second corner meet to thereby calculate a second turning path, and subsequently correcting the second turning path according to the calculated gradient angle of the road surface; and calculating a third turning angle, a third stop position, and a parking end position satisfying a condition in which the vehicle is aligned along a central line of the parking space to thereby calculate a third turning path, and subsequently correcting the third turning path according to the calculated gradient angle of the road surface.

The controlling of steering may include: turning the vehicle to reverse from the parking start position to the first stop position at the first turning angle according to the corrected first turning path; turning to move forwards from the first stop position to the second stop position at the second turning angle according to the corrected second turning path; and turning to reverse from the second stop position to the third stop position at the third turning angle according to the corrected third turning path, and reversing from the third stop position to the parking end position.

The method may further include: when the reverse perpendicular parking is performed, outputting reverse parking state information according to a gradient of the road surface to an output device through at least one among video, audio, and text.

The recognizing of a parking space may include: sensing the obstacle and measuring a width and a length of the parking space; and measuring positions of a first corner and a second corner with respect to the obstacle.

The sum of the first turning angle, the second turning angle, and the third tuning angle may be 90 degrees.

In another general aspect, an automatic parking controlling apparatus of a vehicle includes: a parking space recognizing unit configured to sense an obstacle on the side of a vehicle to recognize a parking space; a gradient angle calculating unit configured to calculate a gradient angle of a road surface by using a gradient of the vehicle and a degree to which the vehicle has slipped backwards according to a comparison between forward movement acceleration of the vehicle and a speed of the vehicle; a parking path calculating unit configured to calculate sequential turning paths for reverse perpendicular parking based on the recognized parking space and to correct the calculated sequential turning paths according to the calculated gradient angle of the road surface to thereby correct the final sequential turning paths for reverse perpendicular parking; and a control unit configured to control steering for reverse perpendicular parking according to the corrected sequential turning paths.

The parking path calculating unit may calculate a first turning angle, a parking start position, and a first stop position satisfying a collision avoidance condition with respect to the first corner and the second corner when the vehicle is steered to the maximum level, to thereby calculate a first turning path, calculate a second turning angle and a second stop position satisfying a condition in which one end of a central line of rear wheels of the vehicle and a y axis of the second corner meet, to thereby calculate a second turning path, and calculate a third turning angle, a third stop position, and a parking end position satisfying a condition in which the vehicle is aligned along a central line of the parking space, to thereby calculate a third turning path, and thereafter, the parking path calculating unit may correct the calculated first, second, and third turning paths according to the gradient angle of the road surface calculated by the gradient angle calculating unit, to thereby calculate final first, second, and third turning paths.

When the reverse perpendicular parking is performed, the control unit may control an output device to output reverse parking state information according to a gradient of the road surface through at least one among video, audio, and text.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the specification, like numbers refer to like elements.

In describing embodiments of the present invention, a detailed description of known techniques associated with the present invention unnecessarily obscure the gist of the present invention, it is determined that the detailed description thereof will be omitted. Moreover, the terms used henceforth have been defined in consideration of the functions of the present invention, and may be altered according to the intent of a user or operator, or conventional practice. Therefore, the terms should be defined on the basis of the entire content of this specification.

Hereinafter, an automatic parking controlling apparatus of a vehicle and a method thereof embodiments of the present invention will be described in detail with reference to the accompanying drawings.

Figure 1:
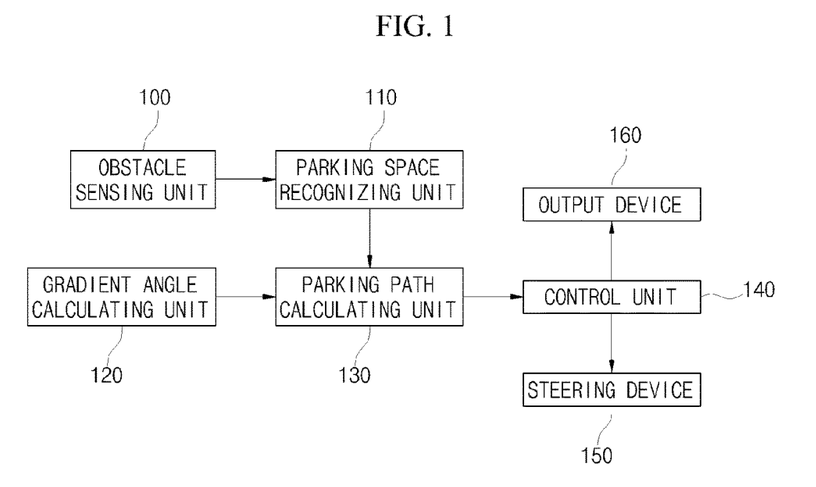
FIG. 1 is a block diagram illustrating a configuration of an automatic parking controlling apparatus of a vehicle according to an embodiment of the present invention.
Figure 2:
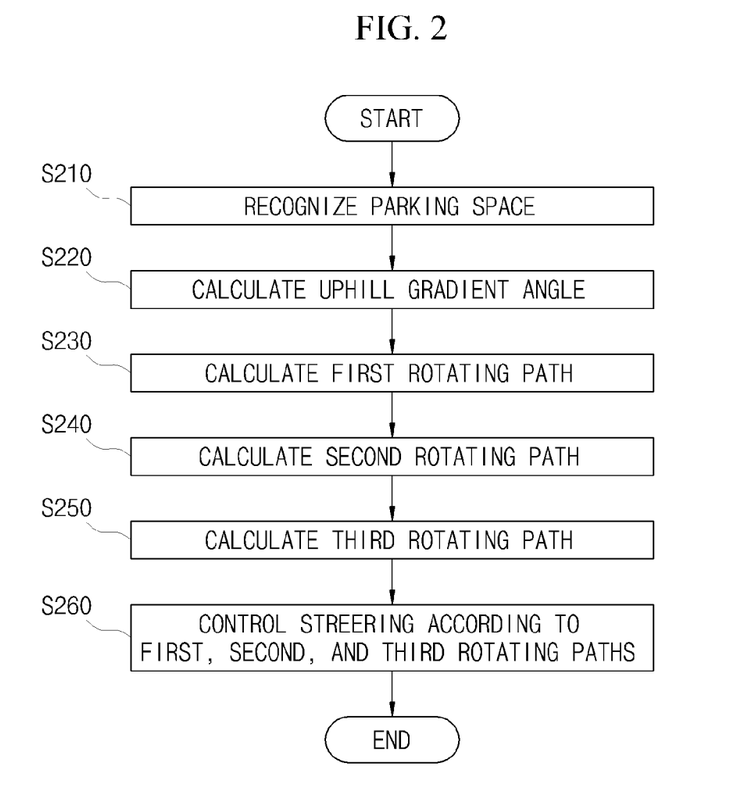
FIG. 2 is a flow chart illustrating an automatic parking controlling method of a vehicle according to an embodiment of the present invention.
Figure 3:
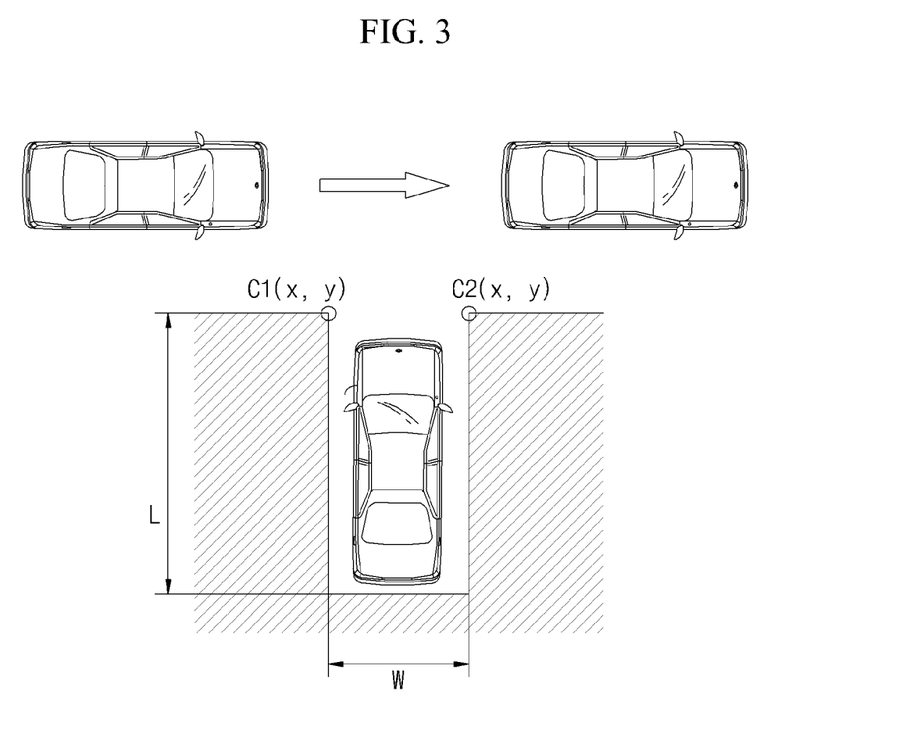
FIG. 3 is a view illustrating a scheme of recognizing a parking space in controlling automatic parking of a vehicle according to an embodiment of the present invention.

FIG. 1 is a block diagram illustrating a configuration of an automatic parking controlling apparatus of a vehicle according to an embodiment of the present invention, FIG. 2 is a flow chart illustrating an automatic parking controlling method of a vehicle according to an embodiment of the present invention, FIG. 3 is a view illustrating a scheme of recognizing a parking space in controlling automatic parking of a vehicle according to an embodiment of the present invention, and FIGS. 4 through 7 are views illustrating a scheme of calculating a turning path for parking in controlling automatic parking of a vehicle according to an embodiment of the present invention.

As illustrated in FIG. 1, an automatic parking controlling apparatus of a vehicle according to an embodiment of the present invention includes an obstacle sensing unit 100, a parking space recognizing unit 110, a gradient angle calculating unit 120, a parking path calculating unit 130, a control unit 140, a steering device 150, and an output device 160.

The obstacle sensing unit 100 may be a sensing means installed in a vehicle to measure a distance to an obstacle and generate an electrical signal corresponding to a measured distance. The obstacle sensing unit 100 may be implemented as an ultrasonic sensor, or the like.

The parking space recognizing unit 110 recognizes a parking space based on an obstacle on the side of the vehicle sensed by the obstacle sensing unit 100.

As illustrated in FIG. 3, the parking space recognizing unit 110 measures a width W and a length L of the parking space by using a distance to an obstacle positioned on one side of the vehicle detected by the obstacle sensing unit 100, and measures positions (x,y) of a first corner C1 and a second corner C2 to recognize the parking space.

Although not shown, the gradient angle calculating unit 120 may calculate an uphill gradient angle by using gradient data of the vehicle sensed by a 3-axis accelerometer and a degree to which the vehicle has slipped backwards, obtained by comparing engine acceleration and a speed of the vehicle, namely, an engine torque value and a speed of the vehicle.

Figure 4:
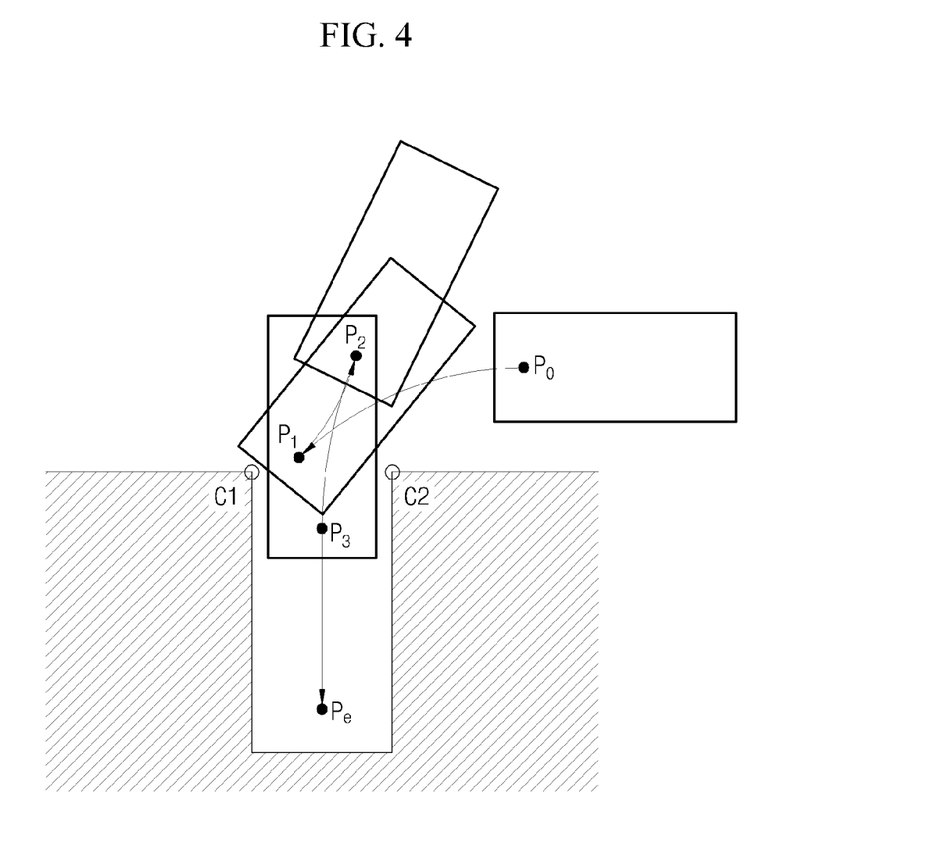
FIGS. 4 through 7 are views illustrating a scheme of calculating a turning path for parking in controlling automatic parking of a vehicle according to an embodiment of the present invention.

As illustrated in FIG. 4, the parking path calculating unit 130 calculates a parking path including a first turning path, a second turning path, and a third turning path based on the width W and the length L of the parking space calculated by the parking space recognizing unit 110 and the positions (x, y) of the first corner C1 and the second corner C2 of the recognized parking space.

Here, when calculating the first turning path, the second turning path, and the third turning path, the parking path calculating unit 130 calculates a parking start position P0 of the vehicle, stop positions P1, P2, and P3, and parking end position Pe with respect to the turning paths.

Hereinafter calculation of the turning paths for reversing perpendicular parking will be described in detail.

Figure 5:
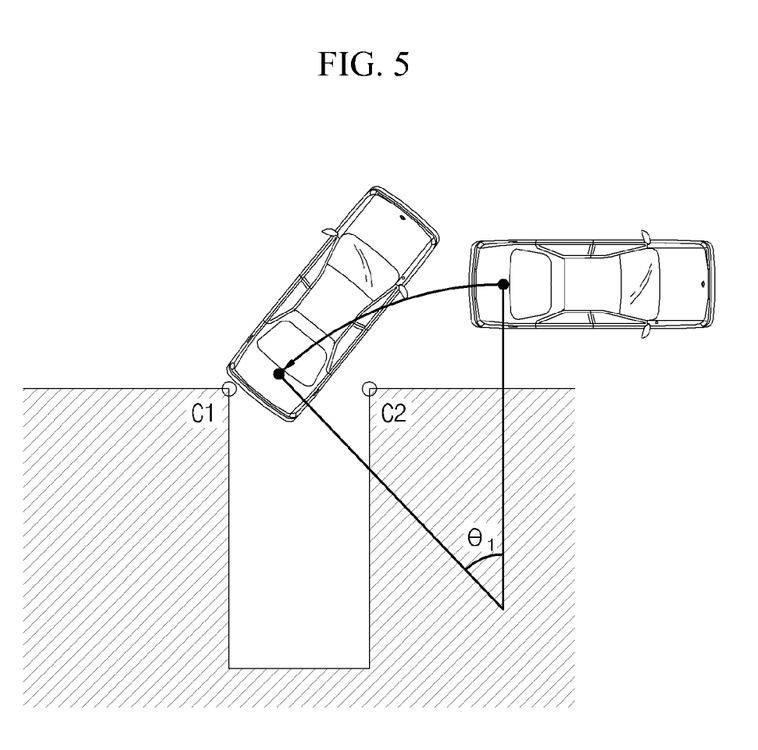

First, as illustrated in FIG. 5, the parking path calculating unit 130 calculates a first turning angle θ1 and the parking start position P0 satisfying a collision avoidance condition with respect to the second corner C2 when the vehicle is steered to the maximum level according to the gradient angle calculated by the gradient angle calculating unit 120, and calculates the first stop position P1 satisfying a collision avoidance condition with respect to the first corner C1, to thereby calculate the first turning path.

Figure 6:
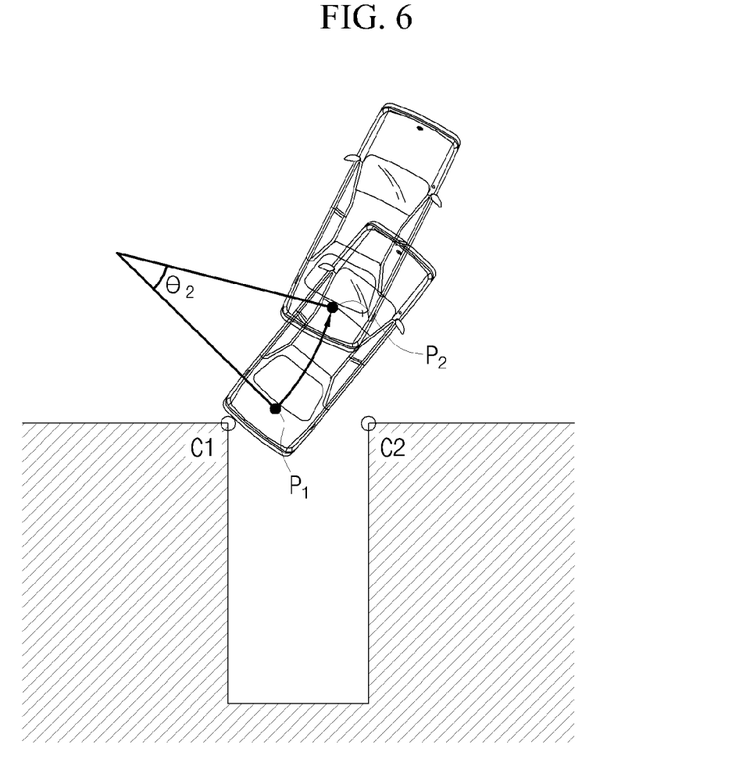

Next, as illustrated in FIG. 6, the parking path calculating unit 130 calculates a second turning angle θ2 and the second stop position P2 satisfying a condition in which one end of a central line of rear wheels and the y axis of the second corner C2 meet when the vehicle turns to move forwards from the first stop position P1 according to the uphill gradient angle calculated by the gradient angle calculating unit 120, to thereby calculate the second turning path. Here, when the vehicle stops at the position where the one end of the central line of rear wheels and the y axis of the second corner C2 meet, the vehicle does not have a possibility of colliding with the second corner C2 in the third turning path.

Figure 7:
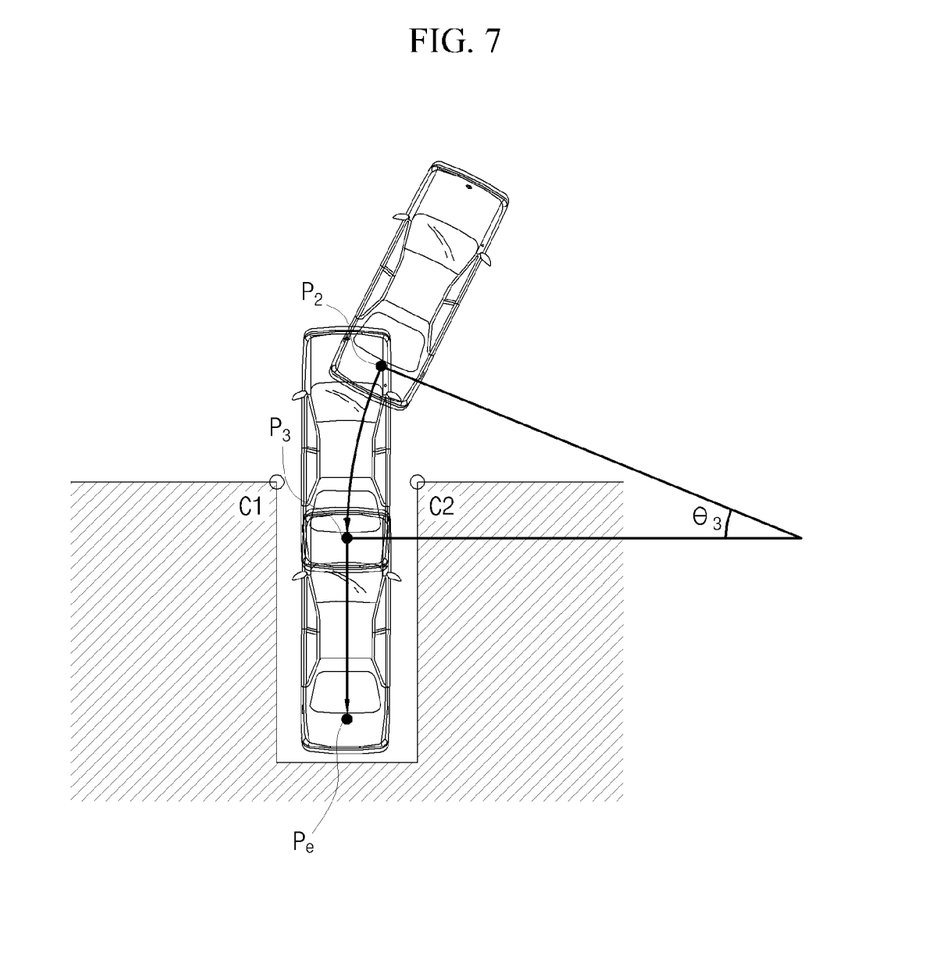

Thereafter, as illustrated in FIG. 7, the parking path calculating unit 130 calculates the third turning angle θ3 and the third stop position P3 satisfying a condition in which the vehicle is aligned along a central line of the parking space when the vehicle turns to reverse from the second stop position P2 in calculating the second turning path according to the uphill gradient angle calculated by the gradient angle calculating unit 120.

Thereafter, the parking path calculating unit 130 calculates the parking end position Pe satisfying a length L condition of the parking space to calculate the third turning path. Here, the sum of the first turning angle, the second turning angle, and the third turning angle is 90 degrees.

Hereinabove, the embodiment in which the parking path calculating unit 130 calculates the first, second, and third turning paths by using the uphill gradient angle information calculated by the gradient angle calculating unit 120 to park the vehicle has been described.

However, in another embodiment, first, second, and third turning paths may be calculated regardless of a gradient angle of the road surface and subsequently corrected according to an uphill gradient by using the uphill (a road surface) gradient angle information calculated by the gradient angle calculating unit 120 to calculate final first, second, and third turning paths for reverse parking on the slope.

In detail, first, as illustrated in FIG. 5, the packing path calculating unit 130 calculates a first turning angle θ1 and the parking start position P0 satisfying a collision avoidance condition with respect to the second corner C2 when the vehicle is steered to the maximum level, and calculates the first stop position P1 satisfying a collision avoidance condition with respect to the first corner C1, to thereby calculate the first turning path.

Next, as illustrated in FIG. 6, the parking path calculating unit 130 calculates a second turning angle θ2 and the second stop position P2 satisfying a condition in which one end of a central line of rear wheels and the y axis of the second corner C2 meet when the vehicle turns to move forwards from the calculated first stop position P1, to calculate the second turning path. Here, when the vehicle stops at the position where the one end of the central line of rear wheels and the y axis of the second corner C2 meet, the vehicle does not have a possibility of colliding with the second corner C2 in the third turning path.

Thereafter, as illustrated in FIG. 7, the parking path calculating unit 130 calculates the third turning angle θ3 and the third stop position P3 satisfying a condition in which the vehicle is aligned along a central line of the parking space when the vehicle turns to reverse from the second stop position P2 in calculating the second turning path, and calculates the parking end position P3 satisfying the length L condition of the parking space to calculate the third orbiting path.

The first, second, and third turning paths calculated thusly are corrected according to the uphill gradient angle calculated by the gradient angle calculating unit 120, namely, according to a degree to which the vehicle has slipped backward, thus calculating final first, second, and third turning paths for reverse perpendicular parking.

The control unit 140 provides a steering control signal to the steering device 150 according to the first turning path, the second turning path, and the third turning path calculated by the parking path calculating unit 130 according to each embodiment, to control steering.

In detail, first, the control unit 140 controls steering according to the first turning path along which the vehicle turns to reverse from the parking start position P0 to the first stop position P1 at the first turning angle θ1.

Subsequently, the control unit 140 controls steering according to the second turning path along which the vehicle turns to move forwards from the first stop position P1 to the second stop position P2 at the second turning angle θ2.

Thereafter, the control unit 140 controls steering according to the third turning path along which the vehicle turns to reverse from the second stop position P2 to the third stop position P3 at the third turning angle θ3 and subsequently reverses from the third stop position P3 to the parking end position P3.

In this manner, the control unit 140 controls the steering device 150 based on the first turning path, the second turning path, and the third turning path to perform steering for reverse perpendicular parking.

The control unit 140 may display information indicating that reverse parking is performed on the sloped road surface, on the output device 160, and in order to ensure safe reverse parking, the control unit 140 may provide control to turn on an emergency light indicating that reverse packing is being performed. Also, the control unit 140 may control the output device 160 to output text and a beep sound indicating a slope proceeding condition. Here, the output device 160 may include a display device, an audio output unit, an emergency lamp, and the like.

An automatic parking controlling method of a vehicle according to an embodiment of the present invention corresponding to operations of the automatic parking controlling apparatus of a vehicle configured described above according to an embodiment of the present invention will be described in stages.

First, referring to FIG. 2, when a vehicle moves forwards, a distance to an obstacle positioned on the side of the vehicle is sensed to recognize a parking space in step S210.

Namely, the parking space is recognized by measuring the width W and the length L of the parking space by detecting the distance to the obstacle, and measuring the positions (x,y) of the first corner C1 and the second corner C2 with respect to the obstacle, thereby recognizing the parking space. An ultrasonic sensor, or the like, may be used as a sensing means installed in the vehicle to measure the distance to the obstacle and generate an electric signal corresponding to the measured distance.

Thereafter, an uphill gradient angle may be calculated by using gradient data of the vehicle sensed by a 3-axis accelerometer and a degree to which the vehicle has slipped backwards, obtained by comparing engine acceleration and a speed of the vehicle, namely, an engine torque value and a speed of the vehicle in step S220.

Subsequently, a first turning path, a second turning path, and a third turning path are calculated based on the uphill gradient angle calculated in step S220 and the width W and the length L of the parking and the positions (x,y) of the first corner C1 and the second corner C2 space calculated in step S210, in steps S230, S240, and S250.

The steps S230, S240, and S250 will be described in more detail. First, as illustrated in FIG. 5, a first turning angle θ1 and the parking start position P0 satisfying a collision avoidance condition with respect to the second corner C2 when the vehicle is steered to the maximum level according to the gradient angle calculated in step S220 are calculated, and the first stop position P1 satisfying a collision avoidance condition with respect to the first corner C1 are calculated, thus calculating the first turning path in step S230.

Subsequently, as illustrated in FIG. 6, a second turning angle θ2 and the second stop position P2 satisfying a condition in which one end of a central line of rear wheels and the y axis of the second corner C2 meet when the vehicle turns to move forwards from the first stop position P1 calculated according to the uphill gradient angle calculated in step S220 are calculated, thus calculating the second turning path in step S240.

Thereafter, as illustrated in FIG. 7, a third turning angle θ3 and the third stop position P3 satisfying a condition in which the vehicle is aligned along a central line of the parking space when the vehicle turns to reverse from the second stop position P2 according to the uphill gradient angle calculated in step S220 are calculated, and the parking end position Pe satisfying the length L condition of the parking space is calculated, thus calculating the third turning path in step S250. Here, the sum of the first turning angle, the second turning angle, and the third turning angle is 90 degrees.

Steering is controlled in order of the calculated first turning path, the second turning path, and the third turning path in step S260. Namely, steering is controlled based on the first turning path along which the vehicle turns to reverse from the parking start position P0 to the first stop position P1 at the first turning angle θ1.

After steering is controlled according to the first turning path, steering is controlled based on the second turning path along which the vehicle turns to move forwards from the first stop position P1 to the second stop position P2 at the second turning angle θ2.

After steering is controlled according to the second turning path, steering is controlled based on the second turning path along which the vehicle turns to reverse from the second stop position P2 to the third stop position P3 at the third turning angle θ3 and reverses from the third stop position P3 to the parking end position Pe.

According to an embodiment of the present invention, when only the x coordinate condition at the second stop position P2, a turning start point at the third turning path, is satisfied, even if an error of the path occurs midway, the vehicle may be parked without a collision.

In a case in which reverse perpendicular parking is performed on the slope, reverse parking on the sloped road surface, information indicating that reverse parking is performed on the sloped road surface may be displayed on the output device 160, and in order to ensure safe reverse parking, an emergency light indicating that reverse packing is being performed may be controlled to be turned on. Also, the output device 160 may be controlled to output text and a beep sound indicating a slope proceeding condition. Here, the output device may include a display device, an audio output unit, an emergency lamp, and the like.

Hereinabove, the embodiment in which the first, second, and third turning paths are calculated by using the uphill gradient angle information calculated by the gradient angle calculating unit 120 to perform reverse perpendicular parking has been described.

However, in a second embodiment, first, second, and third turning paths may be calculated regardless of a gradient angle and subsequently corrected according to an uphill gradient by using the uphill gradient angle information calculated in step S220 to calculate final first, second, and third turning paths for reverse parking on the slope.

In detail, first, after a parking space is recognized such as in step S210, an uphill gradient angle may be calculated by using gradient data of the vehicle sensed by a 3-axis accelerometer and a degree to which the vehicle has slipped backwards, obtained by comparing engine acceleration and a speed of the vehicle, namely, an engine torque value and a speed of the vehicle.

Subsequently, a first turning path, a second turning path, and a third turning path are calculated based on the width W and the length L of the calculated parking space and the positions (x,y) of the first corner C1 and the second corner C2 regardless of the uphill gradient angle.

Namely, as illustrated in FIG. 5, the first turning angle θ1 and the parking start position P0 satisfying a collision avoidance condition with respect to the second corner C2 when the vehicle is steered to the maximum level are calculated, and the first stop position P1 satisfying a collision avoidance condition with respect to the first corner C1 are calculated, thus calculating the first turning path.

Subsequently, as illustrated in FIG. 6, the second turning angle θ2 and the second stop position P2 satisfying a condition in which one end of a central line of rear wheels and the y axis of the second corner C2 meet when the vehicle turns to move forwards from the calculated first stop position P1 are calculated, thus calculating the second turning path.

Thereafter, as illustrated in FIG. 7, the third turning angle θ3 and the third stop position P3 satisfying a condition in which the vehicle is aligned along a central line of the parking space when the vehicle turns to reverse from the second stop position P2 are calculated, and the parking end position Pe satisfying the length L condition of the parking space is calculated, thus calculating the third turning path.

After the first, second, and third turning paths are calculated, the calculated first, second, and third turning paths are corrected according to the uphill gradient calculated in step S220, namely, according to a degree to which the vehicle has slipped backwards on the slope, thus calculating final first, second, and third turning paths for reverse perpendicular parking. Here, the sum of the first turning angle, the second turning angle, and the third turning angle is 90 degrees.

The steering device is sequentially controlled according to the first, second, and third turning paths finally calculated according to the uphill gradient angle, thus performing reverse parking.

The operations of controlling the steering device according to the calculated first, second, and third turning paths to perform reverse perpendicular parking according to the foregoing two embodiments may be briefed up as follows. First, in order to perform reverse perpendicular parking of the vehicle, the vehicle turns to reverse from the parking start position P0 to the first stop position P1 at the first turning angle θ1 (first turning path).

Thereafter, the vehicle turns to move forwards from the first stop position P1 to the second stop position P2 at the second turning angle θ2 (second turning path).

Subsequently, the vehicle turns to reverse from the second stop position P2 to the third stop position P3 at the third turning angle θ3 and reverses from the third stop position P3 to the parking end position Pe (third turning path), thus completing parking.

Thus, according to an embodiment of the present invention, since three turning paths for performing reverse perpendicular parking are simplified, a parking time can be reduced. Namely, by simplifying a path for reverse perpendicular parking, a parking time can be reduced and a load related to an electronic control unit (ECU) and steering can be reduced.

Also, even though a path error occurs midway, a collision with an obstacle does not made only if x coordinate conditions of the start point and the second turning start point are met, allowing for safe parking.

In addition, in an embodiment of the present invention, since a parking path appropriate for a parking space is generated and steering for reverse perpendicular parking is performed, a vehicle may be parked even in a narrow space, enhancing user convenience.

In addition, since a turning path is accurately calculated in consideration of a phenomenon in which a vehicle slips backward due to a gradient angle of a road surface, a collision with an obstacle can be prevented when a driver parks a vehicle according to the gradient angle of the road surface. Even when a path error occurs in the middle of performing reverse parking, a collision does not made only if x coordinate conditions of a parking start point and a turning start point are met, allowing for safe parking.

In addition, even through a vehicle slips backward or leans to one side due to a slope, steering is controlled by calculating a turning path is calculated based on a gradient angle, shortening a parking time.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An automatic parking controlling apparatus of a vehicle, the apparatus comprising a processor that comprises:
   a parking space recognizer configured to recognize a parking space based on an obstacle on a side of the vehicle sensed by an obstacle sensing unit;
   a gradient angle calculator configured to;
      calculate a gradient angle of a road surface using a gradient of the vehicle, and
      calculate a degree to which the vehicle has slipped backwards based on a comparison between an engine acceleration of the vehicle and a speed of the vehicle;
   a parking path calculator configured to calculate sequential turning paths for reverse perpendicular parking based on the calculated gradient angle of the road surface, the calculated degree to which the vehicle has slipped backwards, and the recognized parking space; and
   a controller configured to control steering for reverse perpendicular parking according to the calculated sequential turning paths.

2. The automatic parking controlling apparatus of claim 1, wherein the parking space recognizer is further configured to measure a width and a length of the parking space, and to measure positions of a first corner and a second corner with respect to the obstacle to recognize the parking space.

3. The automatic parking controlling apparatus of claim 2, wherein the parking path calculator is further configured to:
   calculate a first turning angle, a parking start position, and a first stop position satisfying a collision avoidance condition with respect to the first corner and the second corner when the vehicle is steered to a maximum level according to the gradient angle of the road surface, to thereby calculate a first turning path,
   calculate a second turning angle and a second stop position satisfying a condition in which one end of a central line of rear wheels of the vehicle and a y axis of the second corner meet according to the gradient angle of the road surface, to thereby calculate a second turning path, and
   calculate a third turning angle, a third stop position, and a parking end position satisfying a condition in which the vehicle is aligned along a central line of the parking space according to the gradient angle of the road surface, to thereby calculate a third turning path.

4. The automatic parking controlling apparatus of claim 2, wherein the parking path calculator is further configured to
   calculate a first turning angle, a parking start position, and a first stop position satisfying a collision avoidance condition with respect to the first corner and the second corner when the vehicle is steered to a maximum level, to thereby calculate a first turning path,
   calculate a second turning angle and a second stop position satisfying a condition in which one end of a central line of rear wheels of the vehicle and a y axis of the second corner meet, to thereby calculate a second turning path,
   calculate a third turning angle, a third stop position, and a parking end position satisfying a condition in which the vehicle is aligned along a central line of the parking space, to thereby calculate a third turning path, and
   correct the calculated first, second, and third turning paths according to the gradient angle of the road surface, to thereby calculate a final first, a final second, and a final third turning paths.

5. The automatic parking controlling apparatus of claim 1, wherein the controller is further configured to control an output device to output reverse parking state information according to a gradient of the road surface through any one or any combination of video, audio, and text, in response to the reverse perpendicular parking being performed.

6. An automatic parking controlling method of a vehicle, the method comprising:
   sensing an obstacle on a side of a vehicle to recognize a parking space;
   calculating a gradient angle of a road surface using a gradient of the vehicle;
   calculating a degree to which the vehicle has slipped backwards based on a comparison between an engine acceleration of the vehicle and a speed of the vehicle;
   calculating sequential turning paths for reverse perpendicular parking based on the calculated gradient angle of the road surface, the calculated degree to which the vehicle has slipped backwards, and the recognized parking space; and
   controlling steering for reverse perpendicular parking according to the calculated sequential turning paths.

7. The automatic parking controlling method of claim 6, wherein the recognizing of the parking space comprises:
   sensing the obstacle and measuring a width and a length of the parking space; and
   measuring positions of a first corner and a second corner with respect to the obstacle.

8. The automatic parking controlling method of claim 7, wherein the calculating of sequential turning paths comprises:
   calculating a first turning angle, a parking start position, and a first stop position satisfying a collision avoidance condition with respect to the first corner and the second corner when the vehicle is steered to a maximum level according to the calculated gradient angle of the road surface, to thereby calculate a first turning path;
   calculating a second turning angle and a second stop position satisfying a condition in which one end of a central line of rear wheels of the vehicle and a y axis of the second corner meet according to the calculated gradient angle of the road surface, to thereby calculate a second turning path; and
   calculating a third turning angle, a third stop position, and a parking end position satisfying a condition in which the vehicle is aligned along a central line of the parking space according to the calculated gradient angle of the road surface, to thereby calculate a third turning path.

9. The automatic parking controlling method of claim 8, wherein the controlling of the steering comprises:
turning the vehicle to reverse from the parking start position to the first stop position at the first turning angle according to the first turning path;
turning to move forwards from the first stop position to the second stop position at the second turning angle according to the second turning path; and
turning to reverse from the second stop position to the third stop position at the third turning angle according to the third turning path, and reversing from the third stop position to the parking end position.

10. The automatic parking controlling method of claim 8, wherein the sum of the first turning angle, the second turning angle, and the third turning angle is 90 degrees.

11. The automatic parking controlling method of claim 6, further comprising outputting reverse parking state information according to the gradient of the road surface to an output device through any one or any combination of video, audio, and text.

12. An automatic parking controlling method of a vehicle, the method comprising:
sensing an obstacle on a side of a vehicle to recognize a parking space;
calculating a gradient angle of a road surface using a gradient of the vehicle;
calculating a degree to which the vehicle has slipped backwards based on a comparison between an engine acceleration of the vehicle and a speed of the vehicle;
calculating sequential turning paths for reverse perpendicular parking based on the recognized parking space;
subsequently correcting the calculated turning paths based on the calculated gradient angle of the road surface and the calculated degree to which the vehicle has slipped backwards to calculate final turning paths for reverse parking on a slope; and
controlling steering for reverse perpendicular parking according to the calculated sequential turning paths.

13. The automatic parking controlling method of claim 12, wherein the calculating of turning paths comprises:
calculating a first turning angle, a parking start position, and a first stop position satisfying a collision avoidance condition with respect to a first corner and a second corner when the vehicle is steered to a maximum level to calculate a first turning path, and subsequently correcting the first turning path according to the calculated gradient angle of the road surface;
calculating a second turning angle and a second stop position satisfying a condition in which one end of a central line of rear wheels of the vehicle and a y axis of the second corner meet to calculate a second turning path, and subsequently correcting the second turning path according to the calculated gradient angle of the road surface; and
calculating a third turning angle, a third stop position, and a parking end position satisfying a condition in which the vehicle is aligned along a central line of the parking space to calculate a third turning path, and subsequently correcting the third turning path according to the calculated gradient angle of the road surface.

14. The automatic parking controlling method of claim 13, wherein the controlling of the steering comprises:
turning the vehicle to reverse from the parking start position to the first stop position at the first turning angle according to the corrected first turning path;
turning to move forwards from the first stop position to the second stop position at the second turning angle according to the corrected second turning path; and
turning to reverse from the second stop position to the third stop position at the third turning angle according to the corrected third turning path, and reversing from the third stop position to the parking end position.

15. The automatic parking controlling method of claim 12, further comprising outputting reverse parking state information according to a gradient of the road surface to an output device through any one or any combination of video, audio, and text, in response to the reverse perpendicular parking being performed.

16. The automatic parking controlling method of claim 12, wherein the recognizing of the parking space comprises:
sensing the obstacle and measuring a width and a length of the parking space; and
measuring positions of a first corner and a second corner with respect to the obstacle.

17. The automatic parking controlling method of claim 14, wherein the sum of the first turning angle, the second turning angle, and the third turning angle is 90 degrees.

18. An automatic parking controlling apparatus of a vehicle, the apparatus comprising a processor that comprises:
a parking space recognizer configured to recognize a parking space based on an obstacle on a side of the vehicle sensed by an obstacle sensing unit;
a gradient angle calculator configured to;
calculate a gradient angle of a road surface using a gradient of the vehicle, and
calculate a degree to which the vehicle has slipped backwards based on a comparison between an engine acceleration of the vehicle and a speed of the vehicle;
a parking path calculator configured to;
calculate sequential turning paths for reverse perpendicular parking based on the recognized parking space, and
correct the calculated sequential turning paths based on the calculated gradient angle of the road surface and the calculated degree to which the vehicle has slipped backwards to correct the final sequential turning paths for reverse perpendicular parking; and
a controller configured to control steering for reverse perpendicular parking according to the corrected sequential turning paths.

19. The automatic parking controlling apparatus of claim 18, wherein the parking path calculator is further configured to
calculate a first turning angle, a parking start position, and a first stop position satisfying a collision avoidance condition with respect to a first corner and a second corner when the vehicle is steered to a maximum level, to thereby calculate a first turning path,
calculate a second turning angle and a second stop position satisfying a condition in which one end of a central line of rear wheels of the vehicle and a y axis of the second corner meet, to thereby calculate a second turning path,
calculate a third turning angle, a third stop position, and a parking end position satisfying a condition in which the vehicle is aligned along a central line of the parking space, to thereby calculate a third turning path, and
correct the calculated first, second, and third turning paths according to the gradient angle of the road surface, to thereby calculate final first, second, and third turning paths.

20. The automatic parking controlling apparatus of claim 18, wherein in response to the reverse perpendicular parking being performed, the controller is further configured to control an output device to output reverse parking state information according to a gradient of the road surface through any one or any combination of video, audio, and text.

\* \* \* \* \*